United States Patent [19]

Walter, deceased

[11] 4,146,103
[45] Mar. 27, 1979

[54] VEHICLE DRIVE SYSTEM
[75] Inventor: Dale E. Walter, deceased, late of Claysburg, Pa., by Mabel E. Walter, administratrix
[73] Assignee: Mabel E. Walter, Claysburg, Pa.
[21] Appl. No.: 807,809
[22] Filed: Jun. 17, 1977
[51] Int. Cl.² .............................................. B60G 3/02
[52] U.S. Cl. ...................................... 180/50; 280/691
[58] Field of Search .............. 180/44 R, 45, 50, 24.11; 280/690, 691; 192/65

[56] References Cited
U.S. PATENT DOCUMENTS

| | | | |
|---|---|---|---|
| 1,476,447 | 12/1923 | Holle | 180/45 |
| 2,103,624 | 12/1937 | Lester | 180/50 |
| 2,608,260 | 8/1952 | Johnson | 180/44 R |
| 2,699,222 | 1/1955 | Van Doorne | 180/24.11 |
| 2,744,597 | 5/1956 | Merritt | 192/65 X |

Primary Examiner—Joseph F. Peters, Jr.
Assistant Examiner—Michael Mar
Attorney, Agent, or Firm—Clarence A. O'Brien; Harvey B. Jacobson

[57] ABSTRACT

A vehicle frame is provided including opposite side and opposite ends and front and rear pairs of opposite side wheel assemblies are independently sprung from opposite end portions of the frame and each wheel assembly includes a journaled dirigible wheel. The frame includes a prime mover drivingly coupled to a trans-axle mounted on a midportion of the frame including a pair of oppositely, transversely, outwardly projecting output shaft portions and opposite side midportions of the frame include gear boxes having input shafts to which the corresponding output shaft portions are drivingly connected. The gear boxes each include front and rear outwardly extending output shafts and each wheel assembly includes a gear assembly including meshed input and output gears. The output shafts are drivingly connected to the corresponding input gears and the output gears are drivingly connected to the corresponding wheels. Cone clutches are utilized either to drivingly connect the output gears to the corresponding wheels or to drivingly connect the output shaft portions of the trans-axle to the input shafts extending to the associated gear boxes mounted on the midportions of the opposite side of the frame. Further, hydraulic steering structure is operatively connected to the front and rear pairs of dirigible wheels for oppositely steering the same.

11 Claims, 11 Drawing Figures

VEHICLE DRIVE SYSTEM

BACKGROUND OF THE INVENTION

Various forms of four-wheel drive vehicles have been heretofore provided. However, most four-wheel drive vehicles driven from a single prime mover include solid front and rear axle assemblies and do not afford independent four-wheel suspension.

In addition, other forms of four-wheel drive vehicles driven from a single prime mover utilize what are commonly termed as limited slip differential assemblies constructed in a manner whereby the wheel afforded the greater traction is driven by a majority of the torque supplied to the associated differential and the wheel afforded less traction is driven by a considerably lesser amount of torque applied to the corresponding differential. However, the present construction of limited slip differentials is such that the transfer of a majority of the rotary torque supplied to a limited slip differential may be alternately transferred between wheels driven by that differential as a result of alternating greater traction afforded by the associated wheels only after a minimum time delay and with the transfer of the majority of rotary torque to the wheel afforded the greater traction being thereafter accomplished suddenly with the result that considerable alternating sudden application of rotary torque to the wheels driven by a limited slip differential is experienced as a result of the traction afforded the wheels driven by the differential experiencing alternating greater traction. This, of course, results in a four-wheel drive vehicle which does not afford maximum traction and is sometimes difficult to maneuver.

Also, conventional four-wheel drive vehicles are not afforded convenient power take-off locations and most four-wheel drive vehicles of the four-wheel steering type include excessively complicated four-wheel steering mechanisms.

Accordingly, a need exists for a four-wheel drive vehicle of the type including independent wheel suspension on all four wheels, simplified four-wheel steering, constant application of rotary torque to a predetermined maximum to all four driving wheels and multiple conveniently located power take-off locations.

Examples of previously known forms of four-wheel drive vehicles including some of the general structural and operational features of the instant invention are disclosed in U.S. Pat. Nos. 923,167, 1,083,135, 1,245,158, 1,274,068, 1,474,198, 2,103,624, 2,367,151, and 2,699,222.

BRIEF DESCRIPTION OF THE INVENTION

The four-wheel drive vehicle of the instant invention includes independently sprung wheels and a drive system whereby a maximum amount of torque, to a predetermined maximum, is supplied to each of the four driving wheels of the vehicle from a single prime mover. Also, the vehicle includes a simplified four-wheel steering system and the drive system includes a pair of opposite side power take-off locations which may be utilized to perform a variety of functions.

The main object of this invention is to provide a four-wheel drive vehicle including four-wheel independent suspension and including a drive system operable to supply equal amounts of rotary torque to each of the driving wheels of the vehicle, up to a predetermined maximum.

A further object of this invention is to provide a vehicle, in accordance with the preceding object, including a simplified form of four-wheel steering.

Yet another object of this invention is to provide a four-wheel drive vehicle including a pair of conveniently located opposite side power take-off locations.

Still another important object of this invention is to provide a vehicle, in accordance with the preceding objects, and constructed in a manner whereby fifth and sixth opposite side additional driving wheels of the non-steerable type may be provided on the vehicle centrally intermediate the front and rear drive wheels thereof.

Yet another object of this invention is to provide a vehicle drive system which may be readily incorporated into various forms of four- and six-wheel drive vehicles.

A final object of this invention to be specifically enumerated herein is to provide a vehicle drive system, in accordance with the preceding objects, and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Referring now more specifically to the drawings, the numeral 10 generally designates the vehicle of the instant invention. The vehicle 10 includes a main frame referred to in general by the reference numeral 12 and including opposite side longitudinal member 14 and 16 interconnected at their front and rear ends by means of front and rear transverse members 18 and 20. In addition, the frame 12 includes further transverse members 22, 24, 26, 28, and 30 extending between the longitudinal members 14 and 16 at points faced longitudinally of the frame 12 intermediate the transverse frame members 18 and 20.

The frame 12 supports a body referred to in general by the reference numeral 32 and including the usual front and rear bumpers 34 and 36.

A prime mover 38 is supported from the frame 12 in any convenient manner and is drivingly coupled to a trans-axle assembly 40 having oppositely transversely outwardly projecting output shaft portions 42 and 44. A pair of gear boxes 46 are spring supported from opposite side portions of the main frame 12 as at 48 and include input shafts 50 to which the output shaft portions 42 and 44 are drivingly connected. The gear boxes 46 include front and rear extending output shafts 51 and the frame includes front and rear pairs of opposite dirigible side wheel assemblies referred to in general by the reference numerals 52, including journaled wheels 54.

Figure 1:
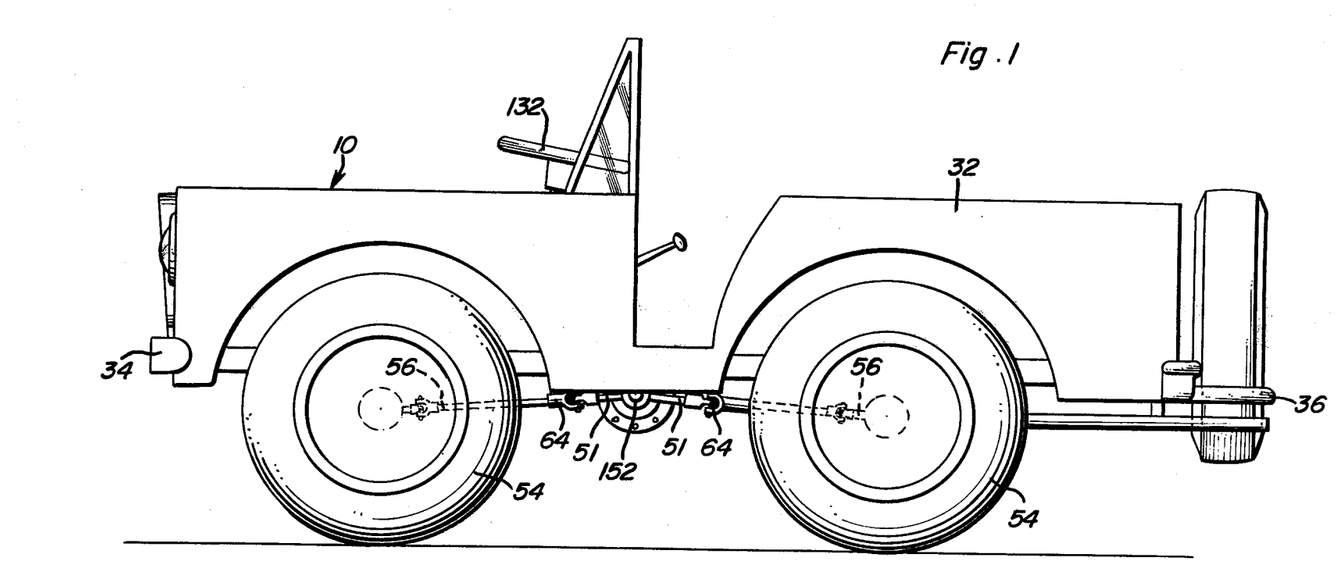
FIG. 1 is a side elevational view of a vehicle constructed in accordance with the present invention.
Figure 2:
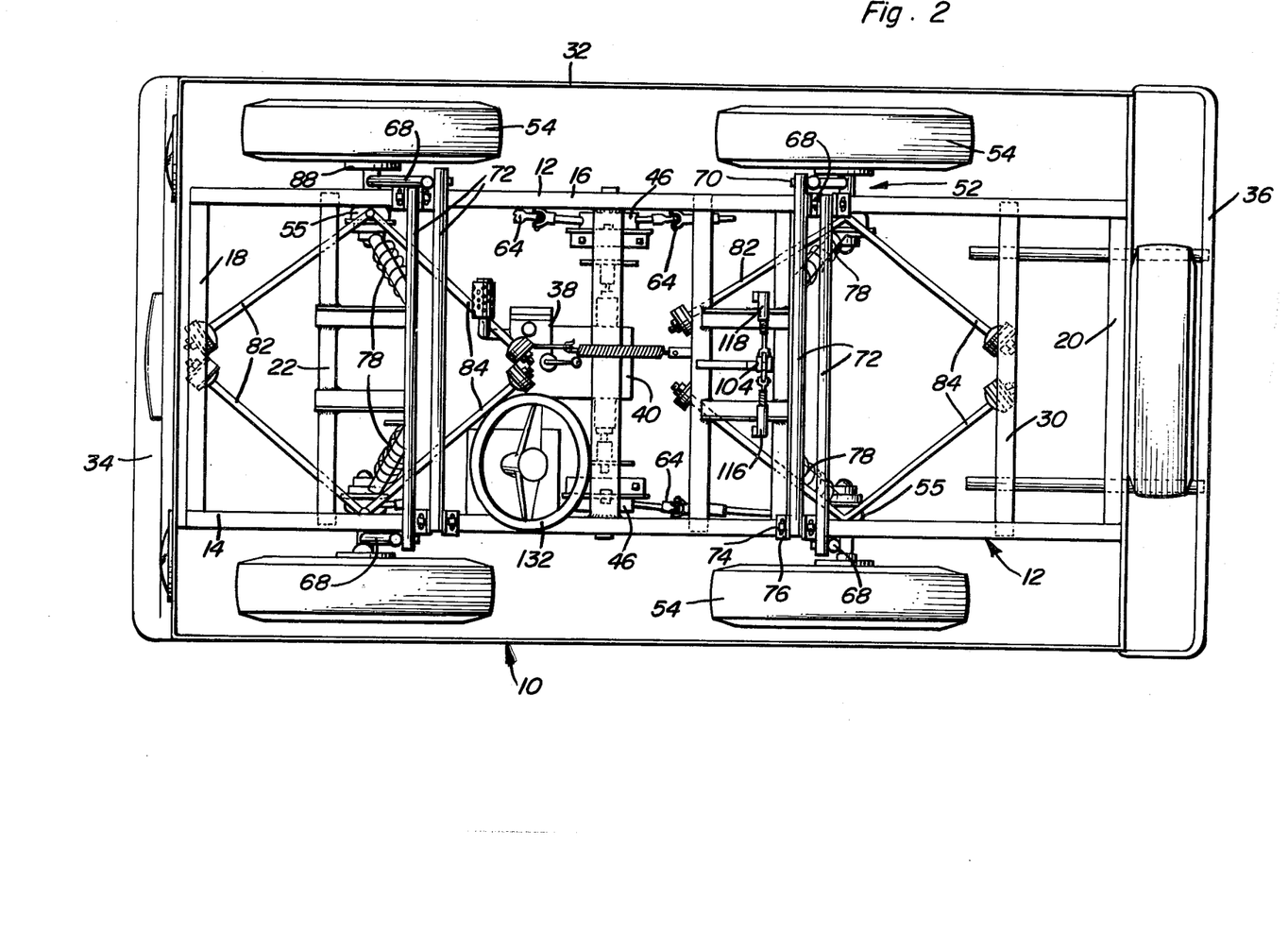
FIG. 2 is a top plan view of the vehicle.
Figure 3:
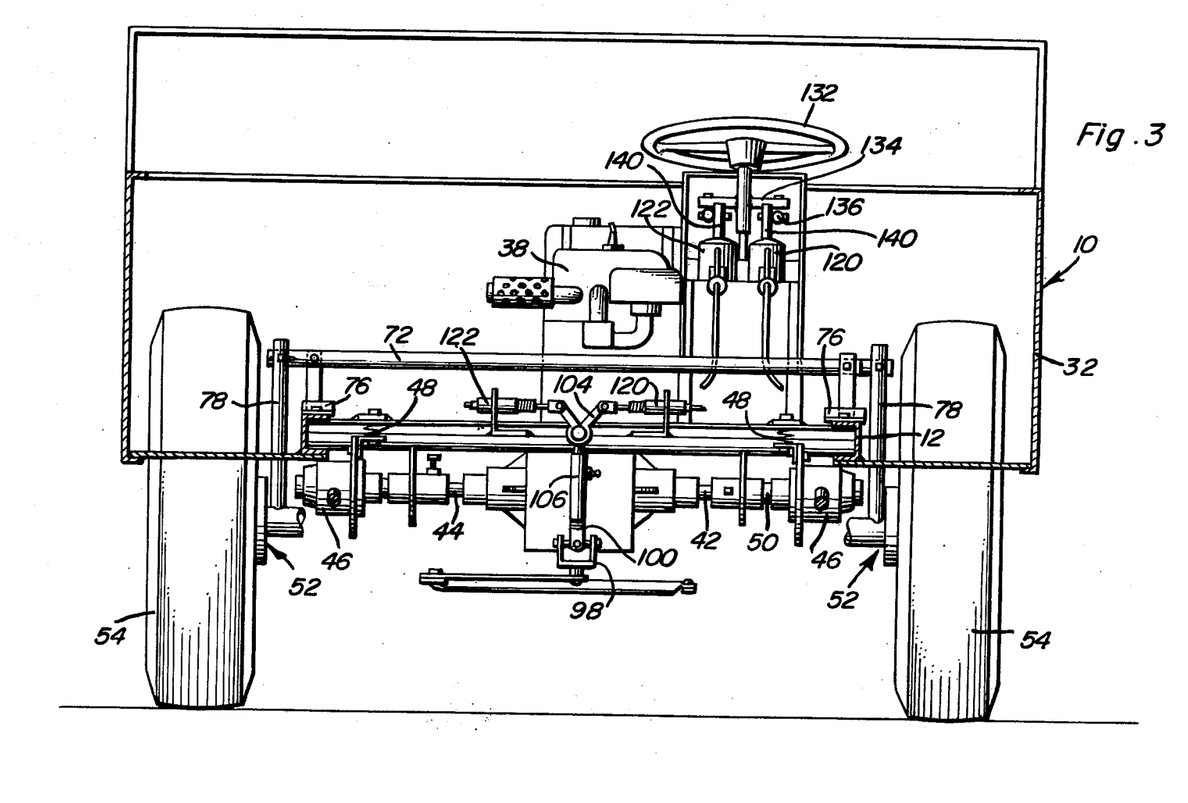
FIG. 3 is an enlarged, vertical, transverse, sectional view of the vehicle taken substantially upon a plane passing through the forward portion thereof and as viewed from the front end of the vehicle.
Figure 4:
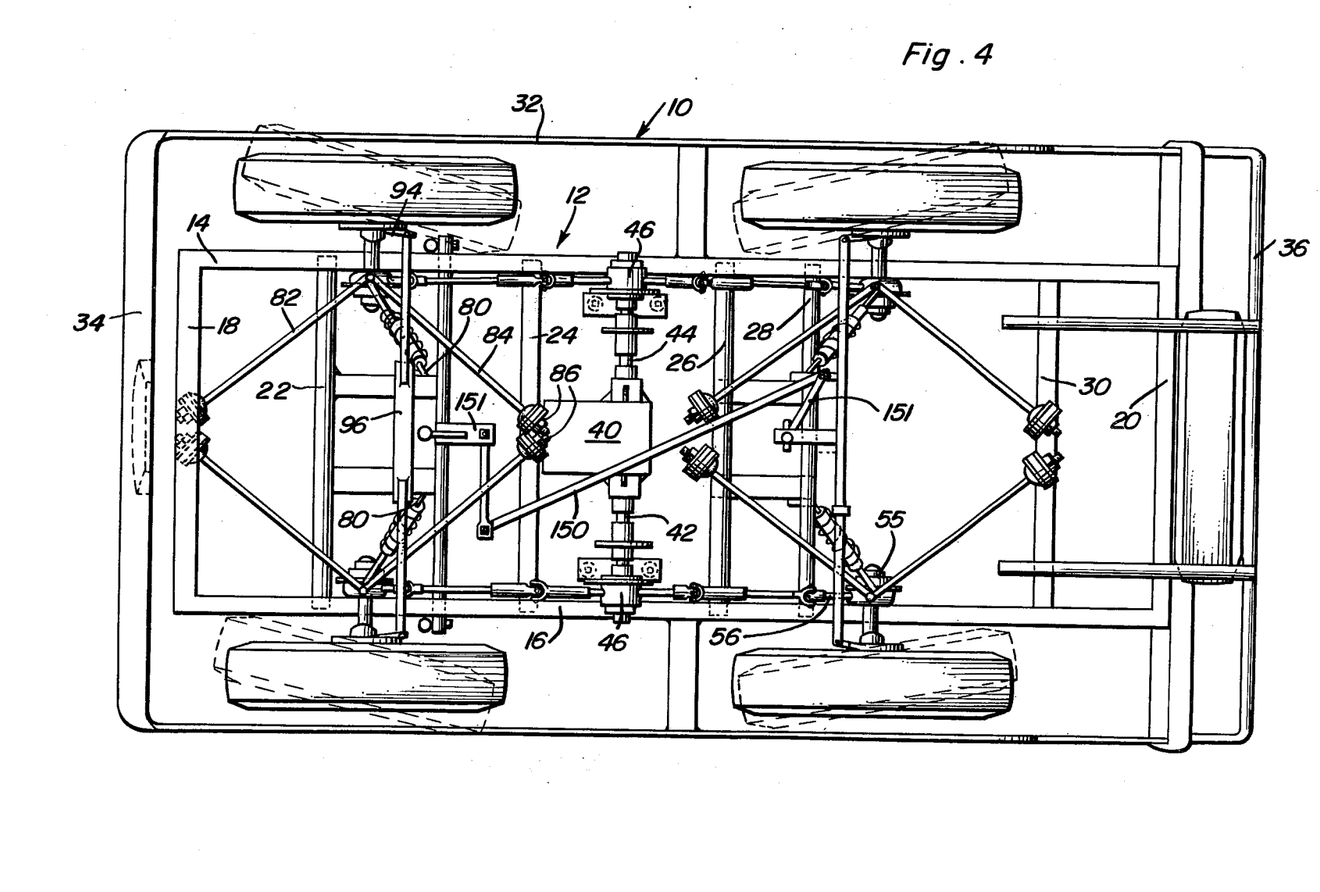
FIG. 4 is a bottom plan view of the vehicle.
Figure 5:
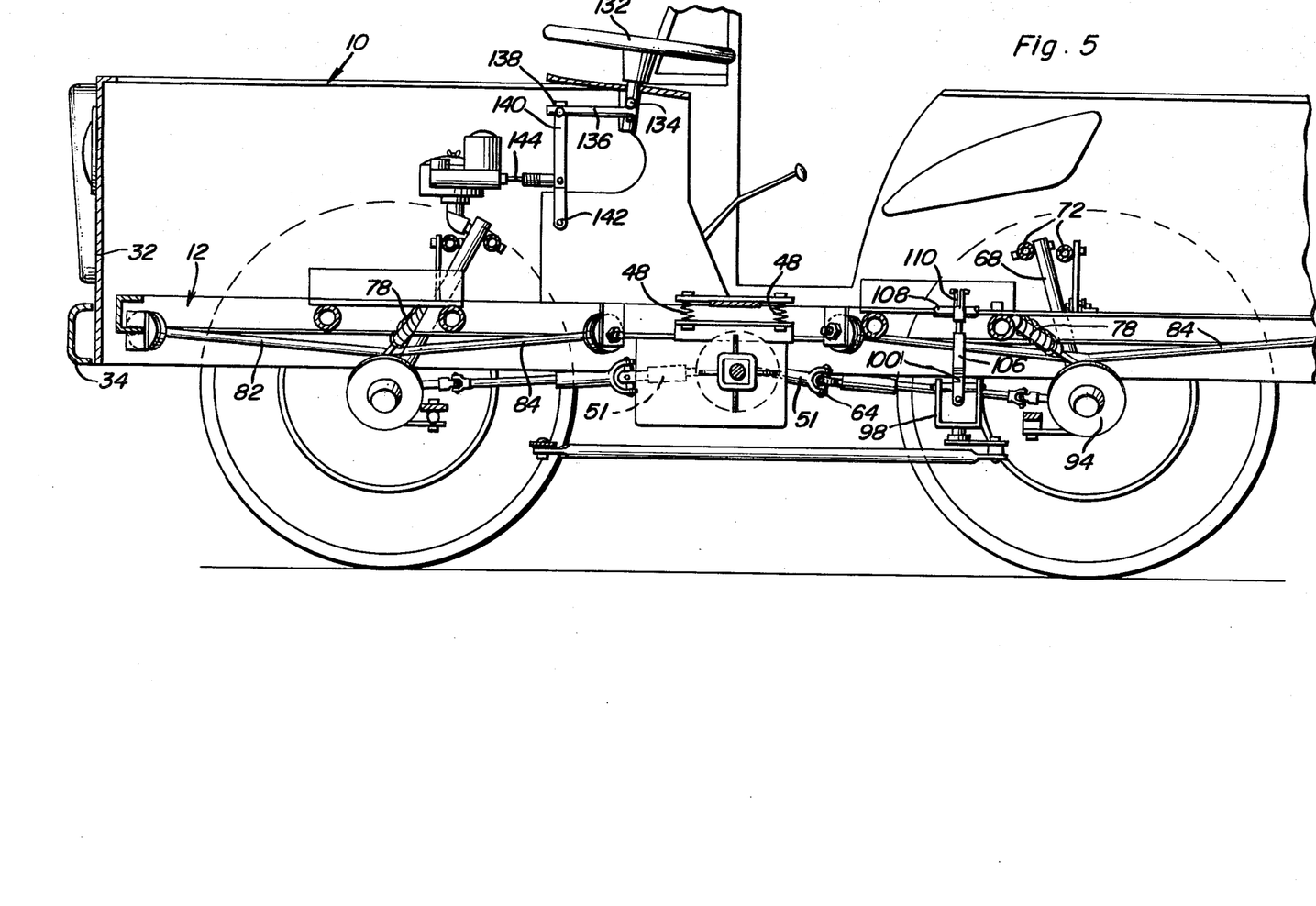
FIG. 5 is an enlarged, fragmentary, longitudinal, vertical, sectional view of the vehicle.
Figure 6:
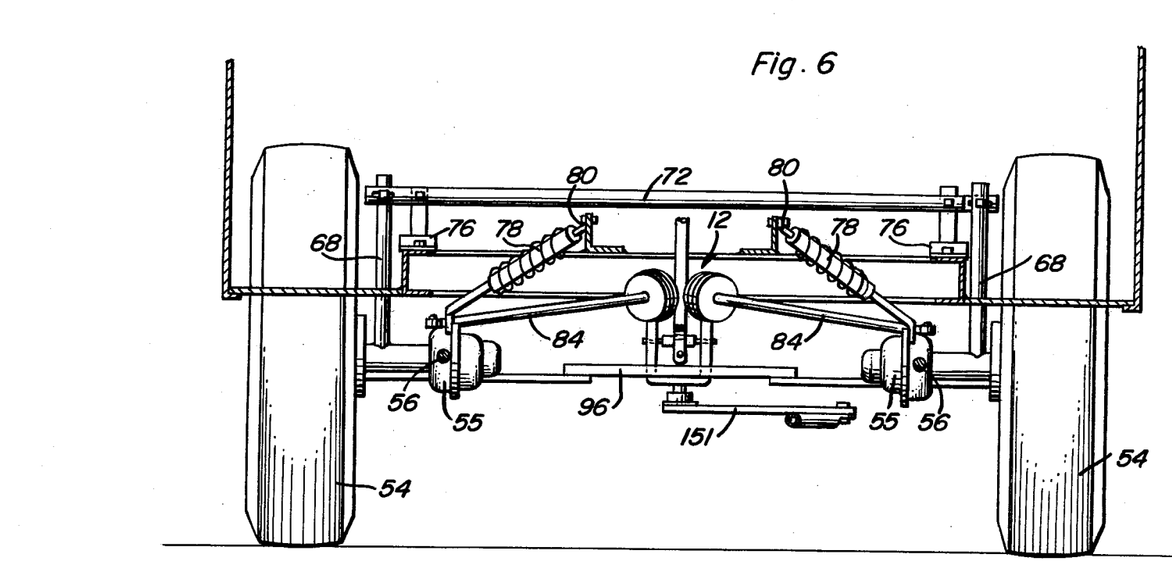
FIG. 6 is an enlarged, fragmentary, transverse, vertical, sectional view of the vehicle taken substantially upon a plane passing through the rear portion thereof.
Figure 7:
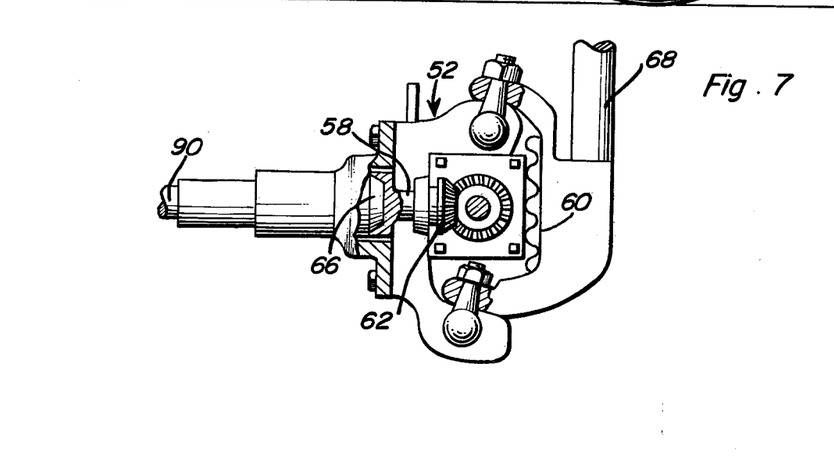
FIG. 7 is a fragmentary, elevational view illustrating one of the dirigible wheel assemblies of the vehicle with parts thereof being broken away.
Figure 8:
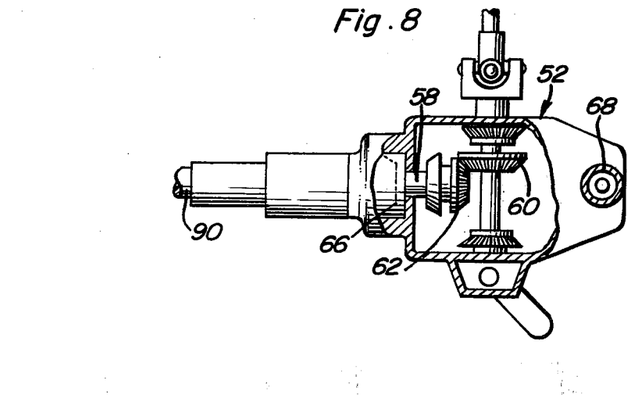
FIG. 8 is a fragmentary, top plan view of the assembly illustrated in FIG. 7.

Each of the wheel assemblies 52 includes a gear assembly 55 including an input gear shaft 56 and an output gear shaft 58 driven from the corresponding input gear shaft 56 by meshed gears 60 and 62 mounted on the shafts 56 and 58. The output shafts 51 are drivingly coupled to the input gear shafts 56 by means of universal joints 64. Each of the output gear shafts 58 is drivingly coupled to the corresponding wheel 54 by means of an adjustable torque transmitting cone clutch assembly 66, see FIG. 7.

Each of the wheel assemblies 52 is supported from the lower end of an upstanding strut 68 whose upper end is pivoted, as at 70, to the adjacent end of a transverse generally horizontal swing arm 72. The end of each swing arm 72 remote from the corresponding strut 68 is pivotally attached, as at 74, to a bracket 76 shiftably supported from the adjacent side of the frame 12 for limited adjustment transversely of the frame. In addition, the lower end of an outwardly inclined combined spring and shock absorber assembly 78 is universally anchored to each of the wheel assemblies 52 and the upper end of each combined spring and shock absorber assembly 78 is universally anchored to the frame 12, as at 80. Also, each wheel assembly has the outboard ends of a pair of outwardly convergent radius arms 82 and 84 universally connected thereto and the inboard diverging ends of each pair of radius arms 82 and 84 are adjustably anchored to adjacent portions of the frame 12, as at 86, for lengthwise threaded adjustment of the radius arms 86 relative to the frame 12. Accordingly, caster and camber adjustments for the wheel assemblies 52 may be effected by the adjustment points 86.

Each of the wheel assemblies 52 includes a hub 88 from which the associated wheel 54 is journaled. The wheels 54 are mounted on shaft portions 90 journaled through the hubs and to which the gears are drivingly connected through the adjustable cone clutch assemblies 66.

Each of the dirigible wheel assemblies 52 includes a steering arm 94 and the front and rear pairs of steering arms 94 and interconnected by means of front and rear adjustable length tie rod assemblies 96 extending transversely of the corresponding ends of the vehicle 10. Each tie rod assembly 96 supports a yoke 98 which opens upwardly and is operatively connected to a corresponding downwardly opening yoke 100 by means of a cross bearing assembly 102. The upper yokes 100 are operatively connected to a corresponding rockable lever arm assembly 104 through a telescopic arm 106 and each lever arm assembly 104 is oscillatably supported from the frame 12, as at 108, for angular displacement about a horizontal axis extending longitudinally of the vehicle 12. Further, each lever arm assembly 104 includes a pair of divergent upwardly projecting arms 110 and 112 to which the piston rod portions 114 of a pair of slave cylinders 116 and 118 are pivotally connected. A pair of master cylinders 120 and 122 are supported from the frame and the master cylinder 120 has its outlet port communicated with a hydraulic line 124 through a line 126 and the opposite ends of the line 124 are connected to the ports of the slave cylinders 116. The outlet port of the master cylinder 122 is communicated with a hydraulic line 128 by means of a line 130 and the line 128 communicates the ports of the slave cylinders 118.

A steering wheel 132 is journaled from the frame and includes a pair of opposite side outwardly projecting shafts 134 to whose outer ends the rear ends of a pair of front to rear extending horizontal links 136 are pivotally connected. The forward ends of the links 136 are pivotally connected, as at 138, to the upper ends of lever arms 140 whose lower ends are pivotally supported from the frame 12, as at 142, and the outer ends of the operating rods 144 of the master cylinders 120 and 122 are pivotally connected to the lever arms 140 intermediate their upper and lower ends.

Figure 9:
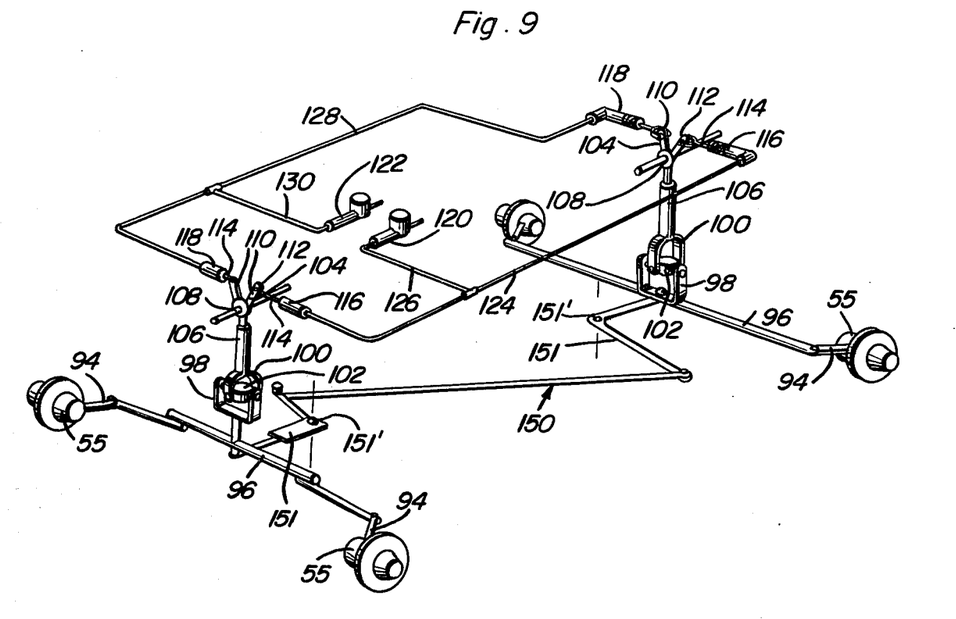
FIG. 9 is a perspective, schematic view of the hydraulic steering system of the vehicle.
Figure 10:
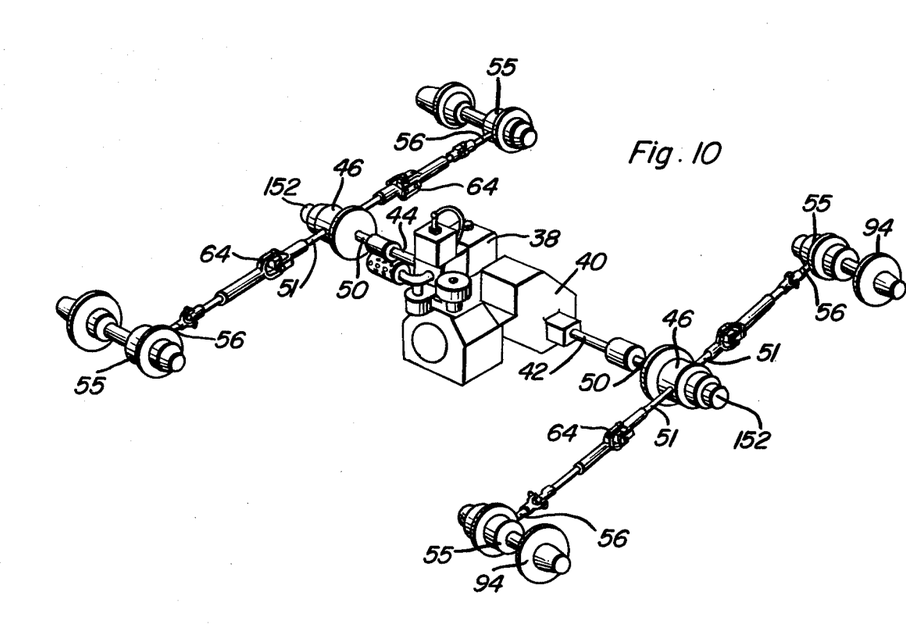
FIG. 10 is a perspective, schematic view of the drive train assembly of the vehicle.

It may thus be seen that by oscillating the steering wheel 132, the operating rods 144 of the master cylinders 120 and 122 may be alternately pushed inwardly so as to cause hydraulic fluid to be alternately forced into the lines 124 and 128 thereby extending the slave cylinders 116 and 118. Thus, the dirigible wheel assemblies 52 at the front and rear ends of the vehicle 10 may be simultaneously oppositely steered. As the piston rod portions 114 of the slave cylinders 116 are extended, the lever arm assemblies 104 have their upper ends swung to the left, as viewed in FIG. 9, and the yokes 100 are thus shifted to the right, as viewed in FIG. 9, whereby the dirigible wheel assemblies 52 at the opposite ends of the vehicle 10 are oppositely angularly displaced.

In addition, the tie rod assemblies 96 are mechanically interconnected by means of a mechanical linkage assembly referred to in general by the reference numeral 150 and including bellcranks 151 oscillatably supported from the frame as at 151' to insure equal and opposite steering movements of the dirigible wheel assemblies 52 at opposite ends of the vehicle, even if one of the master cylinders 120 and 122 is for some reason rendered inoperative.

Various means (not shown) may be provided for braking the vehicle 10. The input shaft for the trans-axle 40 may have a suitable brake assembly oppositely associated therewith or the individual output shaft portions 42 and 44 of the trans-axle 40 may be braked. Further, individual brake assemblies may be provided for each of the journaled wheels 54.

The outboard sides of the gear boxes 46 include capped output shaft portions 152 directly driven from the input shafts 50 and which may be readily uncapped and utilized as power take-off shafts for driving various equipment. Further, the capped output shaft portions 42 may have center wheels corresponding to the wheels 54 mounted thereon centrally intermediate the front and rear wheels 54 whereby a six-wheel vehicle with all wheels being drivable is provided.

Figure 11:
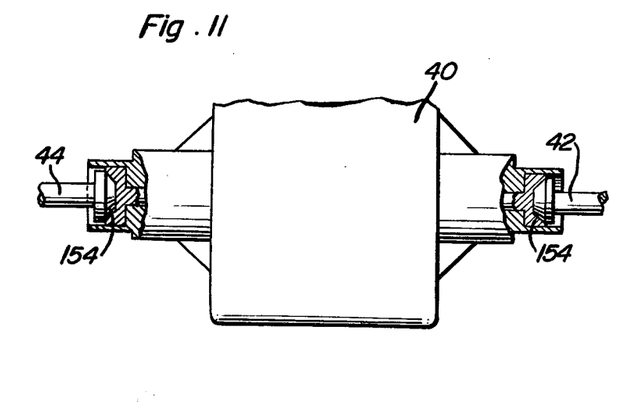
FIG. 11 is a fragmentary view of the trans-axle of a modified form of drive train utilizing cone clutches to drivingly connect the output shaft portions of the trans-axle to the input shafts of the opposite side mid-frame gear boxes in lieu of the cone clutches provided to drivingly connect the gear assembly output gears to the associated journaled wheels and illustrated in FIG. 7.

If a six-wheel vehicle is to be provided, however, the cone clutch assemblies 66 may be dispensed with and adjustable cone clutches 154, see FIG. 11, operatively associated with the output shaft portions 42 and 44 may be utilized whereby the three wheels on each side of the vehicle will be driven through a single cone clutch. Also, the spacing between the wheel assemblies 52 must be increased, or the diameter of the wheels 54 decreased, to provide additional clearance between the front and rear wheels 52 for the fifth and sixth wheel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a vehicle frame including opposite sides and opposite ends, front and rear pairs of opposite side dirigible wheel assemblies independently sprung from opposite end portions of said frame, each wheel assembly including a journaled wheel, and said wheel assemblies each being pivotally anchored to the lower end of an upstanding strut, the upper end of each strut being pivotally anchored to an adjacent end of a generally horizontal transverse swing arm, the ends of said swing arms remote from said struts each being pivotally anchored to a mount structure for oscillation about a horizontal axis extending longitudinally of the frame, said mount structures each being supported from said frame for adjustable positioning transversely thereof.

2. The combination of claim 1 including an upstanding and telescopic spring and shock absorber for each of said wheel assemblies, the upper and lower end portions of each of said shock absorbers being universally connected to said frame and wheel assemblies, and a set of front and rear pairs of forwardly and rearwardly convergent, respectively, radius arms connected between said frame and each pair of front and rear wheel assemblies, the divergent ends of each set of front and rear pairs of radius arms being universally anchored to the corresponding pair of opposite side wheel assemblies and the convergent ends of each set of front and rear pairs of radius arms being universally anchored to said frame for longitudinal adjustment of said convergent ends relative to said frame.

3. The combination of claim 1 including suspension spring means operatively connected between said frame and each of said wheel assemblies, a set of front and rear pairs of forwardly and rearwardly convergent, respectively, radius arms connected between said frame and each pair of front and rear wheel assemblies, the divergent ends of each set of front and rear pairs of radius arms being universally anchored to the corresponding pair of opposite side wheel assemblies and the convergent ends of each set of front and rear pairs of radius arms being universally anchored to said frame for longitudinal adjustment of said convergent ends relative to said frame.

4. In combination, a vehicle frame including opposite sides and opposite ends, front and rear pairs of opposite side dirigible wheel assemblies independently sprung from opposite end portions of said frame, each wheel assembly including a journaled wheel, a steering arm on each wheel assembly, a tie rod connected between the steering arms of each pair of front and rear wheel assemblies, a pair of opposing hydraulic slave cylinders connected between said frame and each tie rod, a steering assembly oscillatably supported from said frame, a pair of master cylinders, means connecting said steering assembly and master cylinders for alternate actuation of the latter in response to oscillation of said steering assembly, and fluid pressure line means communicating each master cylinder with corresponding slave cylinders of the pairs of slave cylinders.

5. The combination of claim 4 including a prime mover supported from said frame and including a power output shaft, a transaxle mounted on a midportion of said frame including a pair of oppositely transversely outwardly projecting output shaft portions to which said output shaft is drivingly coupled through said transaxle, a pair of opposite side gear boxes each including an input shaft and front and rear projecting power shaft portions, means drivingly connecting said output shaft portions to the corresponding input shafts, said wheel assemblies including meshed drive and driven gears, means drivingly connecting said power shaft portions to the corresponding drive gear, and connecting means drivingly connecting said driven gears to the corresponding wheels.

6. The combination of claim 5 including an upstanding and telescopic spring and shock absorber for each of said wheel assemblies, the upper and lower end portions of each of said shock absorbers being universally connected to said frame and wheel assemblies, and a set of front and rear pairs of forwardly and rearwardly convergent, respectively, radius arms connected between said frame and each pair of front and rear wheel assemblies, the divergent ends of each set of front and rear pairs of radius arms being universally anchored to the corresponding pair of opposite side wheel assemblies and the convergent ends of each set of front and rear pairs of radius arms being universally anchored to said frame for longitudinal adjustment of said convergent ends relative to said frame.

7. The combination of claim 6 wherein said connecting means includes adjustable torque transfer friction clutch means.

8. The combination of claim 7 wherein each of said friction clutch means includes a cone clutch.

9. The combination of claim 7 wherein the outer sides of said gear boxes include outwardly facing shaft ends driven directly from said output shaft portions and which may be used as convenient power take-off shafts or, alternately, have a center pair of opposite side wheels mounted thereon.

10. In combination, a vehicle frame including opposite sides and opposite ends, front and rear pairs of opposite side dirigible wheel assemblies independently sprung from opposite end portions of said frame, each wheel assembly including a journaled wheel, and said wheel assemblies each being pivotally anchored to the lower end of an upstanding strut, the upper end of each strut being pivotally anchored to an adjacent end of a generally horizontal transverse swing arm, the ends of said swing arms remote from said struts each being pivotally anchored to a mount structure for oscillation about a horizontal axis extending longitudinally of the frame, suspension spring means operatively connected between said frame and each of said wheel assemblies, a set of front and rear pairs of forwardly and rearwardly convergent, respectively, radius arms connected between said frame and each pair of front and rear wheel assemblies, the divergent ends of each set of front and rear pairs of radius arms being universally anchored to the corresponding pair of opposite side wheel assemblies and the convergent ends of each set of front and rear pairs of radius arms being universally anchored to said frame for longitudinal adjustment of said convergent ends relative to said frame.

11. The combination of claim 10 including a prime mover supported from said frame and including a power output shaft, a transaxle mounted on a midportion of said frame including a pair of oppositely transversely outwardly projecting output shaft portions to which said output shaft is drivingly coupled through said transaxle, a pair of opposite side gear boxes each including an input shaft and front and rear projecting power shaft portions, means drivingly connecting said output shaft portions to the corresponding input shafts, said wheel assemblies including meshed drive and driven gears, means drivingly connecting said power shaft portions to the corresponding drive gear, and connecting means drivingly connecting means drivingly connecting said driven gears to the corresponding wheels.

* * * * *